Dec. 20, 1932.   T. H. SYMINGTON   1,891,584
TRUCK BOLSTER
Filed March 22, 1927
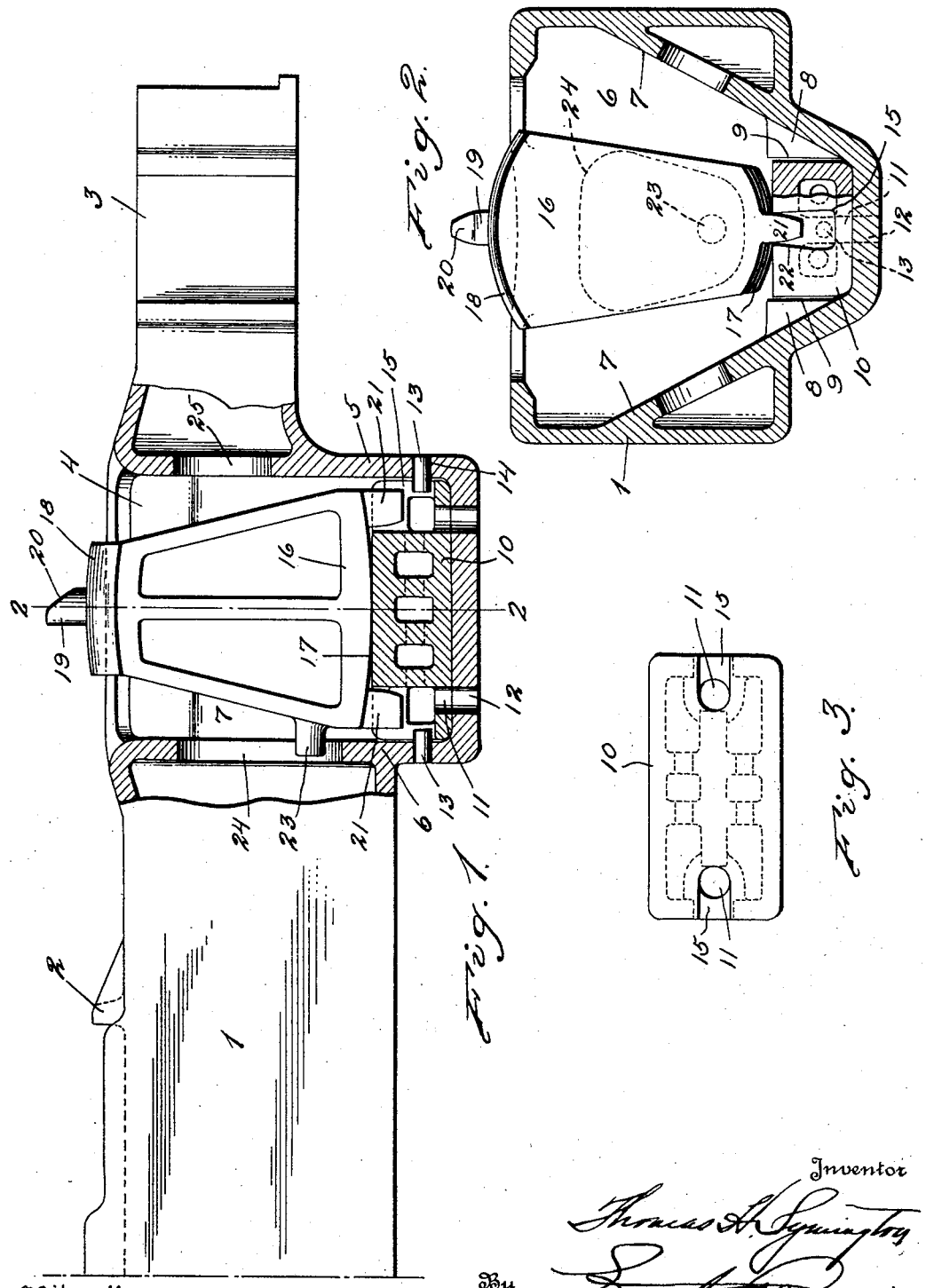
Inventor
Thomas H. Symington
By
his Attorney
witness
John Milton Jester Patented Dec. 20, 1932

1,891,584

UNITED STATES PATENT OFFICE

THOMAS H. SYMINGTON, OF BALTIMORE, MARYLAND, ASSIGNOR TO T. H. SYMINGTON & SON, INC., OF BALTIMORE, MARYLAND, A CORPORATION OF MARYLAND

TRUCK BOLSTER

Application filed March 22, 1927. Serial No. 177,287.

The invention relates to truck bolsters forming part of the trucks of railway cars.

The principal object of the invention, generally stated, is to provide a truck bolster equipped with peculiarly constructed and mounted side bearings capable of rocking movement longitudinally and transversely of the truck bolster in accordance with swivelling movement or lateral movement of the body bolster.

An important object of the invention is to provide a truck bolster with side bearings in the form of rockers having partially spherical bearing surfaces at the top and bottom for cooperation with the body bolster and bearing means within the truck bolster, respectively, it being a feature that these surfaces may be of the same or different degrees of curvature depending upon conditions which may exist and depending upon the preference of the manufacturer.

Another important object of the invention is to provide a truck bolster with side bearing rockers so mounted, arranged and related that the axes of the rockers will be kept on the axis of the bolster, specific means being provided for this purpose, this means acting also to insure normal neutral position of the parts and return of the movable parts to their normal or neutral position after swivelling movement of the body and truck bolsters with respect to each other, or lateral motion of the body bolster, has occurred.

A more specific object of the invention is to provide a truck bolster having pockets spaced inwardly from its ends, within which pockets are mounted the side bearing rockers, detachable bearing members being located within the pockets for supporting the rockers.

Still another object of the invention is to provide novel means whereby the bearing members beneath the side bearing rockers may be disengaged from their holding means to permit withdrawal in case any necessity for such action should arise.

A further object of the invention is to provide a combined side bearing rocker supporting member and position retaining member, the bearing member performing the twofold function of supporting the rocker and cooperating with means thereon for effecting centering.

Another object of the invention is to provide a truck bolster with side bearing rockers having means at their upper ends for positive engagement with suitable elements depending from a body bolster for limiting the relative movement to rocking instead of permitting sliding of the body bolster with respect to the side bearing rockers.

Yet another object of the invention is the provision of a truck bolster and side bearing rocker structure in which means is provided for preventing incorrect placing or assembly of the side bearing rockers, proper positioning of the body bolster engaging element being consequently assured.

A further object is the provision in a truck bolster of this character of means permitting the egress of any water, dirt or foreign matter which might fall into the pockets within which the side bearing members are located, the accumulation of such matter being consequently avoided and friction reduced.

The invention contemplates the provision of various other detailed features and objects, together with simplicity in construction, ease in assembly, as well as efficiency and durability in service, as will be hereinafter described and illustrated in the accompanying drawing in which:

Figure 1 is a view, partly in elevation and partly in vertical section, through one half of a truck bolster embodying the invention, Figure 2 is a vertical cross sectional view taken on the line 2—2 of Figure 1, and Figure 3 is a detail plan view of one of the side bearing rocker supporting members.

Referring more particularly to the drawing the numeral 1 designates the bolster as a whole and this bolster may in many respects be substantially the same as those used in or constituting standard equipment, the advantage being that by having the general dimensions and contour of conventional pattern the bolster may be used to replace an ordinary one without necessitating any changes in the construction of the truck parts. The bolster 1 is here represented as having a center bearing 2 for the reception of the center plate, not shown, ordinarily provided on the body bolster, likewise not shown, the arrangement or construction of the center plate and center bearing being such as to permit not only swivelling movement of the truck and body bolsters but also lateral motion. The bolster is also formed at each end with the usual extension 3 for mounting within the window openings of the truck side frames, as is customary, guide ribs being of course provided coacting with the column guides.

In carrying out the invention, each end portion of the bolster is provided, inwardly of the extension 3, with a pocket 4 defined by outer and inner walls 5 and 6 and side walls 7, the former being preferably vertical and the latter diverging upwardly or being inclined as shown, partly to obtain the maximum strength but principally to make the bottom of the pocket considerably smaller than the upper portion. The pocket is shown as of greater depth than the height of the bolster and consequently projects below the bottom thereof, as clearly indicated in the drawing, though this is probably a manufacturing detail which might be varied depending upon the will of the manufacturer. Formed upon the inclined side walls 7 of the pocket are inwardly extending oppositely arranged webs or ribs 8 which have vertical confronting faces 9 and which act as retaining means for a bearing member 10 of block-like form fitting somewhat loosely within the bottom of the pocket. Displacement of the bearing member 10 longitudinally of the bolster is prevented by the walls 5 and 6 and displacement laterally of the bolster or the pocket therein is prevented by the webs or ribs 8. To reduce the weight of this bearing member 10 to the minimum, it may preferably be cored out as illustrated, though this is a non-essential detail. Furthermore the bearing member 10 is preferably provided with openings 11 registering with openings 12 in the bottom wall of the pocket so as to permit the escape of water or any foreign matter accumulating or tending to accumulate within the pocket, this feature being of advantage in reducing or preventing friction which would result from the presence of such matter upon any of the bearing surfaces to be described.

For retaining the bearing member 10 in the pocket and preventing upward displacement thereof from any cause, I may conveniently employ pins 13, or their equivalent, which pins are driven into and through openings 14 in the walls 5 and 6, their inner ends projecting into slots 15 in the end portions of the bearing member. These slots also serve another purpose to be described hereinafter.

Located within each pocket 4 and seating upon the bearing member 10 is a rocker 16 having partially spherical lower and upper surfaces 17 and 18 respectively, the former being of course capable of rocking movement in any direction upon the flat top surface of the bearing member 10, and the latter being adapted to coact with or bear against a side bearing element, not shown, depending from the body bolster. The rocker is further provided at the center of its top surface 18 with a lug 19 adapted to fit within a suitable socket in the above mentioned but not illustrated side bearing element carried by the body bolster. In view of the fact that lateral motion of the bolster is contemplated in addition to swivelling movement this lug must be so shaped as not to bind and for this reason it is represented as having one corner portion cut away at an incline as indicated at 20 so that this lug may accommodate itself properly within the opening provided for its reception regardless of the position of the rocker. It is preferable that the bottom surface 17 have a more gradual curvature than the top surface 18 though it is conceivable that, if desired, the curvature might be the same in both instances or reversed as compared with the showing.

It becomes of importance to prevent the rocker from sliding about in the pocket and to insure its return to neutral position after relative swivelling movement of the truck and body bolsters. For this reason I have shown the bottom of the rocker as provided at opposite sides, or its outer and inner sides, with depending teeth 21 which engage within the slots 15 above described. These teeth are preferably tapered downwardly and the side walls 22 of the slots 15 are oppositely inclined, or in other words they converge upwardly for cooperation with the sides of the teeth 21 without binding regardless of the position which may be assumed by the rocker. Clearly, the engagement of the teeth 21 within the slots 15 will prevent the rockers from slipping about on the bearing members 10, the movement being limited to one of a rocking nature. This will of course avoid the development of undesired friction at the contacting areas. The same action is true of the engagement of the lugs 19 with the side bearing elements depending from the body bolster. It will be equally apparent that after relative swivelling movement of the truck and body bolsters has occurred or lateral motion developed the rockers will be restored always to their normal or neutral positions.

Owing to the peculiar shape of the lug 19 it becomes important that the rockers be correctly assembled within the pockets as otherwise binding would occur. For this reason each rocker is shown as provided at its inner face with a spud 23 accommodated within an opening 24 in the wall 6. The wall 5 is shown as having an opening 25 therein but this second mentioned opening does not extend as far downwardly as the first named so that if an attempt were made to insert a rocker within its pocket in a position reverse of the proper one the spud 23 would strike against the bottom edge of the opening 25 and prevent assembly of the parts.

The bolster is of course installed in exactly the same manner as the ordinary variety and, as mentioned above, may be used as a replacement. In operation, the side bearing rockers 16 will of course permit the relative swivelling movement of the truck and body bolsters and will also permit lateral motion of the body bolster with respect to the truck, this being desirable for reasons which are well understood in the art. The interengaging teeth and slots on the rocker and bearing member therefor, respectively, and the lug at the top of the rocker will insure return of the parts to normal after any relative movement of the truck and body bolsters. The pockets are of such size and shape as to permit free movement of the rockers under any and all conditions. It is believed that the construction, operation and advantages will be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A truck bolster provided at each end portion with a pocket, a bearing member removably mounted within the bottom of each pocket, a rocker seated upon said bearing member and having its top and bottom surfaces formed as spherical sections, a lug on the top of the rocker adapted for coaction with the depending element on a body bolster, and coacting means at the bottom of the rocker and on the bearing member for limiting the rocker to rocking movement and effecting return of the parts to neutral position subsequent to relative movement of the truck and body bolsters.

2. A truck bolster provided at each end portion with a pocket, a bearing member removably mounted within the bottom of each pocket, a rocker seated upon said bearing member and having its top and bottom surfaces formed as spherical sections, a lug on the top of the rocker adapted for coaction with the depending element on a body bolster, and teeth at the bottom of the rocker having interfitting engagement with slots in the bearing member for limiting the rocker to rocking movement and centering the parts.

3. A truck bolster having each end portion provided with a pocket defined between outer and inner vertical walls and upwardly diverging side walls, a bearing member removably mounted within the bottom of the pocket, a rocker seated upon the bearing member and having its top and bottom surfaces formed as sections of a sphere and having its top provided with a lug adapted to coact with a bearing element depending from a body bolster, said bearing member having slots in its ends, and teeth at the bottom of the rocker engaging within said slots.

4. A truck bolster having each end portion provided with a pocket defined between outer and inner vertical walls and upwardly diverging side walls, a bearing member removably mounted within the bottom of the pocket, a rocker seated upon the bearing member and having its top and bottom surfaces formed as sections of a sphere and having its top provided with a lug adapted to coact with a bearing element depending from a body bolster, said bearing member having slots in its ends, teeth at the bottom of the rocker engaging within said slots, the bearing member being provided with openings at the bottom of said slots, and the bottom of the pocket being formed with openings registering with said openings to permit the escape of foreign matter and water tending to accumulate within the pocket.

5. A truck bolster provided near each end with a pocket defined between outer and inner walls and side walls, one wall having an opening, a bearing member within the bottom of the pocket, a rocker seated upon the bearing member and having its upper and lower surfaces formed as sections of a sphere permitting rocking movement of the rocker in any direction in accordance with relative swivelling movement of the truck and body bolsters and in accordance with lateral motion of the latter, a lug on the upper end of the rocker adapted to cooperate with a depending side bearing element carried by the body bolster, and means for preventing incorrect assembly of the rocker with respect to its pocket comprising a lateral spud on the rocker adapted to be received within said opening.

6. A truck bolster provided near each end with a pocket defined between outer and inner walls and side walls, a bearing member within the bottom of the pocket, a rocker seated upon the bearing member and having its upper and lower surfaces formed as sections of a sphere permitting rocking movement of the rocker in any direction in accordance with relative swivelling movement of the truck and body bolsters and in accordance with lateral motion of the latter, a lug on the upper end of the rocker adapted to cooperate with a depending side bearing element carried by the body bolster, and means for preventing incorrect assembly of the rocker with respect to its pocket, comprising a laterally projecting portion thereon, one wall of the pocket having an opening therein accommodating said projection.

7. A side bearing rocker having its top and bottom surfaces spherical and provided at its top with an upstanding lug for cooperation with a body bolster, the rocker having a spud at one side adapted to cooperate with a portion of a truck bolster for facilitating correct assembly.

8. A truck bolster provided near each end with a pocket, a bearing member located within the bottom of each pocket and having its end portions formed with recesses opening out to the top and the ends, a load sustaining side bearing rocker mounted upon said bearing member for universal movement, teeth on the underside of the rocker at the ends thereof operating within said recesses to serve as means for returning the rocker to normal position after rocking movement, said recesses having downwardly diverging side walls to permit rocking movement of the rocker transversely of the bolster without binding.

9. A truck bolster provided near each end with a pocket, a bearing member located within the bottom of each pocket and having its end portions formed with recesses opening out to the top and the ends, a load sustaining side bearing rocker mounted upon said bearing member for universal movement, teeth on the underside of the rocker at the ends thereof operating within said recesses to serve as means for returning the rocker to normal position after rocking movement, said recesses having downwardly diverging side walls to permit rocking movement of the rocker transversely of the bolster without binding, and pins extending horizontally through the sides of the pocket and engaging within said recesses below said teeth for maintaining said bearing member in proper position against displacement.

10. A truck bolster provided near each end with a pocket defined between outer and inner walls and side walls, a bearing member within the bottom of the pocket, a rocker seated upon the bearing member and adapted to have universal movement with respect thereto, the rocker having an upstanding lug thereon adapted to cooperate with an apertured side bearing element carried by a body bolster, the lug having its corner toward the end of the bolster beveled off, and means for insuring correct positioning of the rocker when assembled in the pocket whereby the beveled corner of the lug will be at the proper location, comprising a projection on one side of the rocker, the inner and outer walls of the pocket being formed with openings, the opening in the inner wall having a depth sufficient to accommodate the projection when the rocker is in the correct relation to the depending bearing element on the body bolster, and the opening in the outer wall of the pocket being sufficiently shallow that the projection will strike thereagainst when an attempt is made to install the rocker in reversed position.

In testimony whereof I affix my signature.
THOMAS H. SYMINGTON.